US009343061B2

(12) United States Patent
Chen et al.

(10) Patent No.: US 9,343,061 B2
(45) Date of Patent: May 17, 2016

(54) METHOD AND APPARATUS FOR CONVERTING TEXT INFORMATION

(71) Applicant: Huawei Device Co., LTD, Shenzhen (CN)

(72) Inventors: Jiong Chen, Beijing (CN); Xiaohai Zhang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 13/896,909

(22) Filed: May 17, 2013

(65) Prior Publication Data

US 2013/0251121 A1 Sep. 26, 2013

Related U.S. Application Data

(63) Continuation of application No. PCT/CN2011/082401, filed on Nov. 18, 2011.

(30) Foreign Application Priority Data

Nov. 19, 2010 (CN) .......................... 2010 1 0553912

(51) Int. Cl.
*H04M 1/64* (2006.01)
*G10L 13/04* (2013.01)
(Continued)

(52) U.S. Cl.
CPC ............ *G10L 13/04* (2013.01); *H04M 3/42068* (2013.01); *H04M 3/42382* (2013.01); *H04M 2201/39* (2013.01); *H04M 2201/60* (2013.01); *H04W 4/18* (2013.01)

(58) Field of Classification Search
CPC ............ H04M 3/5307; H04M 2201/60; H04L 12/589

USPC ...................... 379/88.13; 709/206; 455/412.2; 340/5.61

See application file for complete search history.

(56) References Cited

U.S. PATENT DOCUMENTS 8,588,377 B2 * 11/2013 Shaffer ............... H04M 3/5335
379/88.02
2003/0034878 A1 * 2/2003 Hull et al. .................... 340/5.61
(Continued)

FOREIGN PATENT DOCUMENTS

CN 101442579 A 5/2009
CN 101883339 A 11/2010
(Continued)

OTHER PUBLICATIONS

International Search Report received in International Application No. PCT/CN2011/082401 mailed Mar. 1, 2012, 6 pages.
(Continued)

*Primary Examiner* — Van D Huynh
(74) *Attorney, Agent, or Firm* — Slater & Matsil, L.L.P.

(57) ABSTRACT

The present invention provides a method and an apparatus for converting text information. The method includes: receiving, by a first terminal, a call or data from a second terminal; obtaining, by the first terminal, according to a mapping relationship between identification information of the second terminal and voice characteristic parameters of an user of the second terminal, the voice characteristic parameters of the user of the second terminal corresponding to the identification information of the second terminal when the first terminal is in a working mode of text-to-voice conversion; and converting, by the first terminal, related text information about the call or data to audio information with the voice characteristic parameters of the user of the second terminal.

16 Claims, 2 Drawing Sheets

(51) Int. Cl.
*H04M 3/42* (2006.01)
*H04W 4/18* (2009.01)

(56) References Cited

U.S. PATENT DOCUMENTS

| | | | | |
|---|---|---|---|---|
| 2007/0174396 A1* | 7/2007 | Kumar | .................... | G10L 13/00 709/206 |
| 2010/0233997 A1* | 9/2010 | Hou | .................. | H04M 3/42051 455/412.1 |
| 2012/0196575 A1* | 8/2012 | Hymel | ....................... | 455/412.2 |

FOREIGN PATENT DOCUMENTS

| CN | 102025801 A | 4/2011 |
|---|---|---|
| JP | 2009-171336 A | 7/2009 |
| KR | 10-2008-0027542 A | 3/2008 |

OTHER PUBLICATIONS

Second Office Action received on Chinese Application No. 201010553912.3, mailed Jun. 6, 2013, 16 pages. (Partial Translation).

First Office Action received on Chinese Application No. 201010553912.3, mailed Sep. 19, 2012, 16 pages. (Partial Translation).

Written Opinion of the International Searching Authority received on Application No. PCT/CN2011/082401, mailed on Mar. 1, 2012, 13 pages.

Zuo, et al., "Telephone Speech Simulation Using Signal Processing Method," Journal of Beijing University of Technology, vol. 29, No. 2, Jun. 2003, 6 pages. (Partial Translation).

\* cited by examiner

METHOD AND APPARATUS FOR CONVERTING TEXT INFORMATION

CROSS-REFERENCE TO RELATED APPLICATIONS

This application is a continuation of International Application No. PCT/CN2011/082401, filed on Nov. 18, 2011, which claims priority to Chinese Patent Application No. 201010553912.3, filed on Nov. 19, 2010, both of which are hereby incorporated by reference in their entireties.

TECHNICAL FIELD

Embodiments of the present invention relate to the field of communications technologies, and in particular, to a method and an apparatus for converting text information.

BACKGROUND

With the development of communications technologies, a terminal has integrated more and more functions, among which a text information conversion function enables a terminal to convert specified text information to audio information with fixed voice characteristic parameters (such as a frequency parameter, a timbre parameter, a tone parameter, and a tune parameter).

In the prior art, a terminal can convert specified text information only to audio information with specific voice characteristic parameters and cannot convert it to audio information with other voice characteristic parameters, and the conversion lacks adaptability and flexibility.

SUMMARY OF THE INVENTION

Embodiments of the present invention provide a method and an apparatus for converting text information to improve adaptability and flexibility of conversion.

An embodiment of the present invention provides a method for converting text information, including receiving, by a first terminal, a call or data from a second terminal, obtaining, by the first terminal, according to a mapping relationship between identification information of the second terminal and voice characteristic parameters of an owner of the second terminal, the voice characteristic parameters of the owner of the second terminal corresponding to the identification information of the second terminal when the first terminal is in a working mode of text-to-voice conversion, and converting, by the first terminal, related text information about the call or data to audio information with the voice characteristic parameters of the owner of the second terminal.

An embodiment of the present invention further provides an apparatus for converting text information, including an information obtaining module, configured to obtain a call or data from a second terminal, a parameter obtaining module, configured to obtain, according to a mapping relationship between identification information of the second terminal and voice characteristic parameters of an owner of the second terminal, the voice characteristic parameters of the owner of the second terminal corresponding to the identification information of the second terminal when a first terminal is in a working mode of text-to-voice conversion, and an information conversion module, configured to convert related text information about the call or data to audio information with the voice characteristic parameters of the owner of the second terminal.

It can be known from the foregoing technical solution that, in the embodiments of the present invention, a first terminal obtains a call or data from a second terminal; when the first terminal is in a working mode of text-to-voice conversion, the first terminal obtains, according to a mapping relationship between identification information of the second terminal and voice characteristic parameters of an owner of the second terminal, the voice characteristic parameters of the owner of the second terminal corresponding to the identification information of the second terminal, so that the first terminal can convert related text information about the call or data to audio information with the voice characteristic parameters of the owner of the second terminal. Using the method and apparatus for converting text information provided in the embodiments of the present invention, the first terminal can convert, according to different identification information of the second terminal, the related text information about the call or data from the second terminal to the audio information with different voice characteristic parameters, thereby improving adaptability and flexibility of conversion and improving user experience on the first terminal.

BRIEF DESCRIPTION OF THE DRAWINGS

To illustrate the technical solutions in embodiments of the present invention more clearly, the following briefly describes the accompanying drawings required for describing the embodiments. Apparently, the accompanying drawings in the following description show some embodiments of the present invention, and persons of ordinary skill in the art may derive other drawings from these accompanying drawings without creative efforts.

DETAILED DESCRIPTION OF ILLUSTRATIVE EMBODIMENTS

To make the objectives, technical solutions, and advantages of the embodiments of the present invention more clearly, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
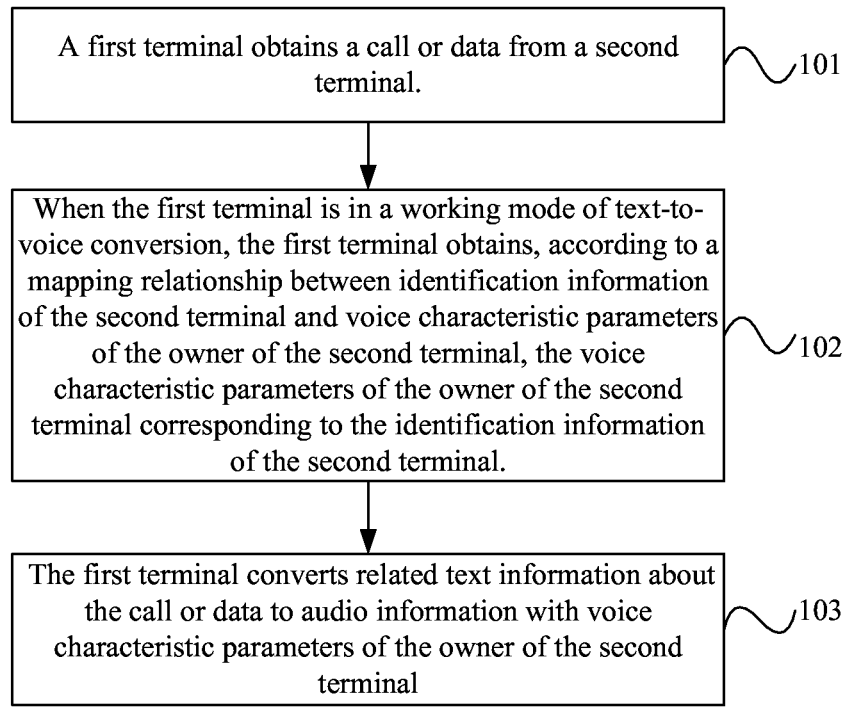
FIG. 1 is a schematic flowchart of a method for converting text information provided in Embodiment 1 of the present invention.

FIG. 1 is a schematic flowchart of a method for converting text information provided in Embodiment 1 of the present invention. As shown in FIG. 1, the method for converting text information provided in the embodiment of the present invention may include the following steps:

Step 101: A first terminal obtains a call or data from a second terminal.

The call may be a voice call or a video call, and the data may be a short message, a push message, a multimedia message or an email.

Step 102: When the first terminal is in a working mode of text-to-voice conversion, the first terminal obtains, according to a mapping relationship between identification information of the second terminal and voice characteristic parameters of an owner of the second terminal, the voice characteristic parameters of the owner of the second terminal corresponding to the identification information of the second terminal.

Prior to this step, the method may further include a step in which the first terminal establishes the mapping relationship between the identification information of the second terminal and the voice characteristic parameters of the owner of the second terminal. Specifically, the first terminal may obtain, through voice communication with the second terminal, the identification information of the second terminal and the voice characteristic parameters of the owner of the second terminal, such as a frequency parameter, a timbre parameter, a tone parameter, and a tune parameter, so that the mapping relationship between the identification information of the second terminal and the voice characteristic parameters of the owner of the second terminal can be established.

Step 103: The first terminal converts related text information about the identification information of the second terminal to audio information with the voice characteristic parameters of the owner of the second terminal.

The related text information about the call may include a phone number of the second terminal (for example, 13911111000, and the like) or at least one type of related information about the phone number of the second terminal stored in a phone book of the first terminal, for example, name information (Gao Xing, Xiao Hu, Qiao Qiao, and the like), name information and text information indicating a service type (Gao Xiao is calling, Xiao Hu is calling, Qiao Qiao is calling, and so on).

The related text information about the data includes at least one type of text content of the data (for example, a text of a short message: busy now and call you later, and the like), a title of the data (for example, a title of an email: As to details about patent application XXXXXXXXXXXXX, and the like), an abstract of the data (for example, an abstract of an email:middle-level leaders will hold a meeting at the big meeting room at 2:30 pm. on Nov. 18, 2010), the phone number of an addresser of the data (for example, 13911111000, and the like), or the name of the addresser of the data (for example, Gao Xing, Xiao Hu, Qiao Qiao, and the like).

Further, after this step, the method may further include a step in which the first terminal plays converted audio information with the voice characteristic parameters of the owner of the second terminal. Specifically, for the related text information about the call or data, the first terminal may play the converted audio information with the voice characteristic parameters of the owner of the second terminal as a ring of the call or data received from the second terminal or directly play the converted audio information with the voice characteristic parameters of the owner of the second terminal as an audio file before, during, or after a ring.

In this embodiment, a first terminal obtains a call or data from a second terminal; when the first terminal is in a working mode of text-to-voice conversion, the first terminal obtains, according to a mapping relationship between identification information of the second terminal and voice characteristic parameters of an owner of the second terminal, the voice characteristic parameters of the owner of the second terminal corresponding to the identification information of the second terminal, so that the first terminal can convert related text information about the call or data to audio information with the voice characteristic parameters of the owner of the second terminal. Using the method for converting text information provided in the embodiment of the present invention, the first terminal can convert, according to different identification information of the second terminal, the related text information about the call or data from the second terminal to the audio information with different voice characteristic parameters, thereby improving adaptability and flexibility of conversion and improving user experience on the first terminal.

It should be noted that, for brevity, the foregoing method embodiments are represented as a series of actions. However, persons skilled in the art should understand that the present invention is not limited to the order of the described actions, because according to the present invention, some steps may adopt other orders or occur simultaneously. It should be further understood by persons skilled in the art that the embodiments described in the present invention all belong to exemplary embodiments, and the involved actions and modules are not necessarily required by the present invention.

In the foregoing embodiments, the description of each embodiment has a respective focus. For a part that is not described in detail in a certain embodiment, reference may be made to related descriptions in other embodiments.

Figure 2:
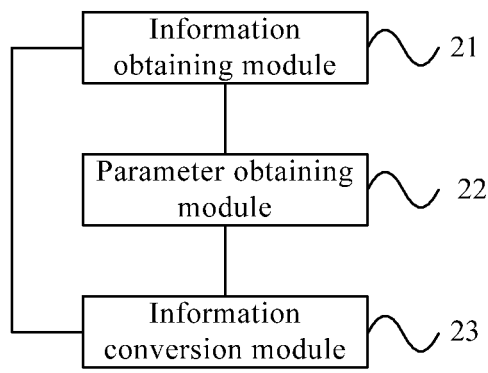
FIG. 2 is a structural schematic diagram of an apparatus for converting text information provided in Embodiment 2 of the present invention.

FIG. 2 is a structural schematic diagram of an apparatus for converting text information provided in Embodiment 2 of the present invention. As shown in FIG. 2, the apparatus, in the embodiment, for converting text information may include an information obtaining module 21, a parameter obtaining module 22, and an information conversion module 23. The information obtaining module 21 obtains a call or data from a second terminal; the parameter obtaining module 22 obtains, according to a mapping relationship between identification information of the second terminal and voice characteristic parameters of an owner of the second terminal, the voice characteristic parameters of the owner of the second terminal corresponding to the identification information of the second terminal when a first terminal is in a working mode of text-to-voice conversion; and the information conversion module 23 converts related text information about the call or data to audio information with the voice characteristic parameters of the owner of the second terminal obtained by the parameter obtaining module 22. The call may include a voice call or a video call; and the data may include a short message, a push message, a multimedia message or an email.

The related text information about the call may include a phone number of the second terminal (for example, 13911111000, and the like) or at least one type of related information about the phone number of the second terminal stored in a phone book of the first terminal, for example, name information (Gao Xing, Xiao Hu, Qiao Qiao, and the like), name information and text information indicating a service type (Gao Xiao is calling, Xiao Hu is calling, Qiao Qiao is calling, and so on).

The related text information about the data includes at least one type of text content of the data (for example, a text of a short message: busy now and call you later, and the like), a title of the data (for example, a title of an email: As to details about patent application XXXXXXXXXXXXX, and the like), an abstract of the data (for example, an abstract of an email: middle-level leaders will hold a meeting at the big meeting room at 2:30 pm. on Nov. 18, 2010), the phone number of an addresser of the data (for example, 13911111000, and the like), or the name of the addresser of the data (for example, Gao Xing, Xiao Hu, Qiao Qiao, and the like).

The functions of the first terminal in Embodiment 1 of the present invention may be implemented by the apparatus for converting text information provided in the embodiment of the present invention.

In this embodiment, the information obtaining module obtains the call or data from the second terminal; the parameter obtaining module obtains, according to the mapping relationship between the identification information of the second terminal and the voice characteristic parameters of the owner of the second terminal, the voice characteristic parameters of the owner of the second terminal corresponding to the identification information of the second terminal when the first terminal is in a working mode of text-to-voice conversion, so that the information conversion module can convert the related text information about the call or data to the audio information with the voice characteristic parameters of the owner of the second terminal. Using the apparatus for converting text information provided in the embodiment of the present invention, the first terminal can convert, according to different identification information of the second terminal, the related text information about the call or data from the second terminal to the audio information with different voice characteristic parameters, thereby improving adaptability and flexibility of conversion and improving user experience on the first terminal.

Figure 3:
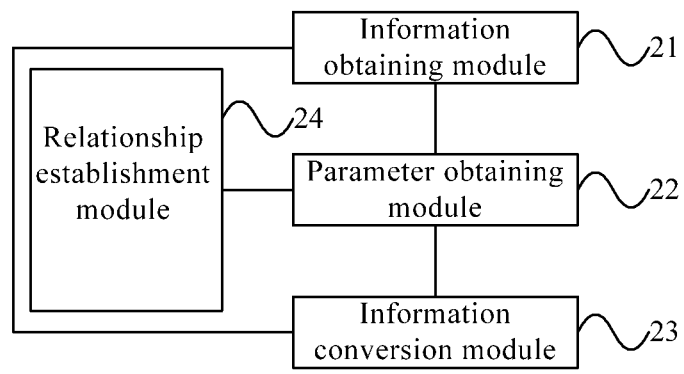
FIG. 3 is another structural schematic diagram of the apparatus for converting text information provided in Embodiment 2 of the present invention.

Further, as shown in FIG. 3, in this embodiment, the apparatus for converting text information may further include a relationship establishment module 24, configured to establish the mapping relationship between the identification information of the second terminal and the voice characteristic parameters of the owner of the second terminal, so that the parameter obtaining module 22 obtains, according to the mapping relationship, the voice characteristic parameters of the owner of the second terminal corresponding to the identification information of the second terminal. Specifically, the relationship establishment module 24 may specifically include an obtaining unit and an establishment unit. The obtaining unit may obtain, through voice communication with the second terminal, the identification information of the second terminal and the voice characteristic parameters of the owner of the second terminal, so that the establishment unit may establish the mapping relationship between the identification information of the second terminal and the voice characteristic parameters of the owner of the second terminal.

Figure 4:
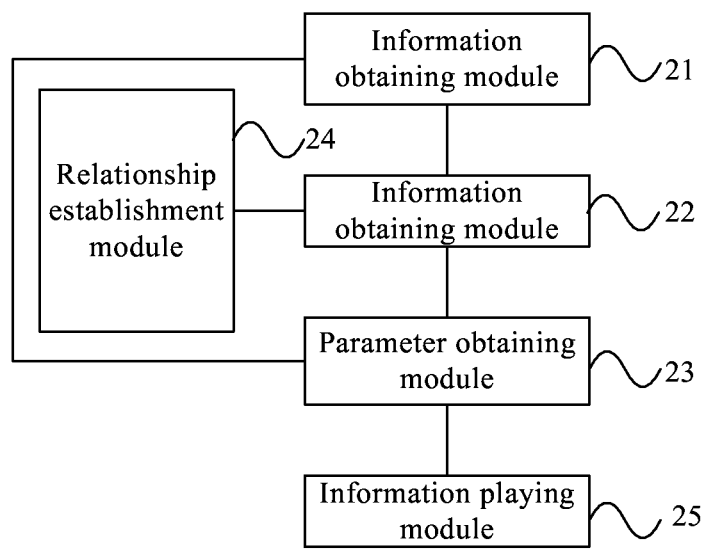
FIG. 4 is still another structural schematic diagram of the apparatus for converting text information provided in Embodiment 2 of the present invention.

Further, as shown in FIG. 4, in this embodiment, the apparatus for converting text information may further include an information playing module 25, configured to play the audio information with the voice characteristic parameters of the owner of the second terminal obtained by the parameter obtaining module 22, where, the audio information is converted by the information conversion module 23.

Persons of ordinary skill in the art may understand that all or part of the steps of the foregoing method embodiments may be implemented by a program instructing relevant hardware. The foregoing program may be stored in a computer readable storage medium. When the program runs, the preceding steps included in the method embodiment are performed. The foregoing storage medium includes any medium that is capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in each embodiment or make equivalent replacements to some technical features thereof, as long as such modifications or replacements do not cause the essence of corresponding technical solutions to depart from the spirit and scope of the present invention.

What is claimed is:

1. A method for converting text information, the method comprising:
   receiving, by a first terminal, a call or data from a second terminal;
   obtaining, by the first terminal, according to a mapping relationship between identification information of the second terminal and voice characteristic parameters of a user of the second terminal, the voice characteristic parameters of the user of the second terminal corresponding to the identification information of the second terminal when the first terminal is in a working mode of text-to-voice conversion;
   converting, by the first terminal, related text information about the identification information of the second terminal to audio information with the voice characteristic parameters of the user of the second terminal, wherein the related text information is not received along with the call or data but is stored in the first terminal before receiving the call or data from the second terminal; and
   playing, by the first terminal and after the converting, the audio information with the voice characteristics of the user of the second terminal as one of a ring of the call or data, or an audio file played before or during, or after the ring.

2. The method according to claim 1, further comprising, before the obtaining, establishing, by the first terminal, the mapping relationship between the identification information of the second terminal and the voice characteristic parameters of the user of the second terminal.

3. The method according to claim 2, wherein the establishing comprises:
   obtaining, by the first terminal, through voice communication with the second terminal, the identification information of the second terminal and the voice characteristic parameters of the user of the second terminal; and
   establishing, by the first terminal, the mapping relationship between the identification information of the second terminal and the voice characteristic parameters of the user of the second terminal.

4. The method according to claim 1, wherein:
   the related text information about the call comprises a phone number of the second terminal or at least one type of related information about the phone number of the second terminal stored in a phone book of the first terminal; and
   the related text information about the data comprises at least one type of text content of the data, a title of the data, an abstract of the data, a phone number of an addresser of the data or a name of the addresser of the data.

5. The method according to claim 3, wherein:
   the related text information about the call comprises a phone number of the second terminal or at least one type of related information about the phone number of the second terminal stored in a phone book of the first terminal; and
   the related text information about the data comprises at least one type of text content of the data, a title of the data, an abstract of the data, a phone number of an addresser of the data or a name of the addresser of the data.

6. The method according to claim 3, wherein after the converting, by the first terminal, related text information about the call or data to audio information with the voice characteristic parameters of the user of the second terminal, the method further comprises:
  playing, by the first terminal, the audio information.

7. The method according to claim 1, wherein:
  the call comprises: a voice call or a video call; and
  the data comprises: a short message, a push message, a multimedia message or an email.

8. The method according to claim 3, wherein:
  the call comprises: a voice call or a video call; and
  the data comprises: a short message, a push message, a multimedia message or an email.

9. An apparatus for converting text information, the apparatus comprising:
  a processor; and
  a non-transitory computer readable medium connected to the processor and having stored thereon instructions that, when executed, cause the processor to:
    obtain a call or data from a second terminal;
    obtain according to a mapping relationship between identification information of the second terminal and voice characteristic parameters of an user of the second terminal, the voice characteristic parameters of the user of the second terminal corresponding to the identification information of the second terminal when a first terminal is in a working mode of text-to-voice conversion;
    convert related text information about the identification information of the second terminal to audio information with the voice characteristic parameters of the user of the second terminal, wherein the related text information is not configured to be received along with the call or data but is stored in the first terminal before obtaining the call or data from the second terminal; and
    play, by the first terminal and after the related text information is converted, the audio information with the voice characteristics of the user of the second terminal as one of a ring of the call or data, or an audio file before, during, or after the ring.

10. The apparatus according to claim 9, wherein the non-transitory computer readable medium further has stored thereon instructions that, when executed, cause the processor to:
  establish the mapping relationship between the identification information of the second terminal and the voice characteristic parameters of the user of the second terminal.

11. The apparatus according to claim 10, wherein the instructions causing the processor to establish the mapping relationship comprise instructions for causing the processor to:
  obtain, through voice communication with the second terminal, the identification information of the second terminal and the voice characteristic parameters of the user of the second terminal; and
  establish the mapping relationship between the identification information of the second terminal and the voice characteristic parameters of the user of the second terminal.

12. The method according to claim 1, wherein the voice characteristic parameters comprise one or more of a frequency parameter, a timbre parameter, a tone parameter, and a tune parameter.

13. The apparatus according to claim 11, wherein the voice characteristic parameters comprise one or more of a frequency parameter, a timbre parameter, a tone parameter, and a tune parameter.

14. A method for converting text information, the method comprising:
  at a first terminal, receiving an audio or video call from a second terminal;
  at the first terminal, obtaining identification information of the second terminal and voice characteristic parameters of an user of the second terminal corresponding to the identification information from the second terminal, wherein the identification information and the voice characteristic parameters are obtained when the first terminal is in a working mode of text-to-voice conversion;
  establishing a mapping relationship between the identification information of the second terminal and the voice characteristic parameters of the user of the second terminal; and
  at the first terminal, converting related text information about the identification information of the second terminal to audio information according to the voice characteristic parameters of the user of the second terminal; and
  at the first terminal, playing, after the converting, the audio information as one of a ring of the audio or video call, or an audio file before, during, or after the ring.

15. The method according to claim 14, wherein the voice characteristic parameters comprise one or more of a frequency parameter, a timbre parameter, a tone parameter, and a tune parameter.

16. The method according to claim 15, wherein:
  the related text information about the call comprises a phone number of the second terminal or at least one type of related information about the phone number of the second terminal stored in a phone book of the first terminal; and
  the related text information about the data comprises at least one type of text content of the data, a title of the data, an abstract of the data, a phone number of an addresser of the data or a name of the addresser of the data.

* * * * *